(12) United States Patent
Hitomi et al.

(10) Patent No.: US 6,533,203 B2
(45) Date of Patent: Mar. 18, 2003

(54) SPINNING REEL SPOOL

(75) Inventors: Yasuhiro Hitomi, Hashimoto (JP); Koji Takikura, Izumi (JP); Yoshiyuki Furomoto, Kishiwada (JP)

(73) Assignee: Shimano Inc., Sakai (JP)

( * ) Notice: Subject to any disclaimer, the term of this patent is extended or adjusted under 35 U.S.C. 154(b) by 0 days.

(21) Appl. No.: 09/725,458

(22) Filed: Nov. 30, 2000

(65) Prior Publication Data

US 2001/0002684 A1 Jun. 7, 2001

(30) Foreign Application Priority Data

Dec. 3, 1999 (JP) .......................................... 11-344319
May 12, 2000 (JP) ...................................... 2000-139795
May 26, 2000 (JP) ...................................... 2000-155617

(51) Int. Cl.⁷ ........................ A01K 89/00; A01K 89/01; A01K 89/015
(52) U.S. Cl. ..................................................... 242/322
(58) Field of Search ................................ 242/322, 224, 242/246; 22/140, 141

(56) References Cited

U.S. PATENT DOCUMENTS

| 4,222,534 A | * | 9/1980 | Ishida | 242/322 |
| 4,911,378 A | * | 3/1990 | Hitomi | 242/246 |
| 5,098,032 A | * | 3/1992 | Toda | 242/246 |
| 5,120,001 A | * | 6/1992 | Kaneko | 242/246 |
| 5,328,127 A | * | 7/1994 | Yoshikawa | 242/246 |
| 5,573,193 A | * | 11/1996 | Bernard et al. | 242/322 |
| 5,603,465 A | | 2/1997 | Henriksson | |
| 5,607,114 A | | 3/1997 | Henriksson | |
| 5,697,567 A | * | 12/1997 | Sonenvald | 242/322 |
| 5,887,811 A | * | 3/1999 | Tsutumi | 242/322 |
| 5,947,400 A | | 9/1999 | Tsutsumi | |
| 6,045,077 A | * | 4/2000 | Bernard et al. | 242/322 |
| 6,164,578 A | * | 12/2000 | Tsutumi | 242/322 |
| 6,283,393 B1 | * | 9/2001 | Kang | 242/246 |

FOREIGN PATENT DOCUMENTS

| EP | 000166668 A1 | * | 1/1986 | 242/322 |
| FR | 1 008 291 | | 5/1952 | |

* cited by examiner

Primary Examiner—Emmanuel Marcelo
(74) Attorney, Agent, or Firm—Shinjyu Global IP Counselors, LLP

(57) ABSTRACT

A spinning reel spool made lightweight while maintaining the strength of the bobbin trunk. The spinning reel spool (4) includes a spool main section (7), a front flange section (8), and a front-flange fixing member (9). The spool main section (7) has a bobbin trunk (7a), a tubular skirt portion (7b) with a larger diameter that is formed unitarily with the rear end of the bobbin trunk (7a), and an inner barrel member (7c) made of a synthetic resin polymer, which is fitted to the inner circumference of the bobbin trunk (7a). The front flange section (8) has a larger diameter and is attached to the front end of the bobbin trunk (7a). The front-flange fixing member (9) fastens the front flange section (8) to the spool main section (7). The bobbin trunk (7a) and the skirt portion (7b) constitute dual larger-smaller stage tubular element that is formed unitarily by press-working a sheet of an aluminum alloy. The inner barrel member (7c) is made of a synthetic resin polymer and is fitted into the bobbin trunk (7a).

37 Claims, 14 Drawing Sheets

SPINNING REEL SPOOL

BACKGROUND OF THE INVENTION

1. Technical Field

The present invention relates to fishing reel spools, and in particular to spinning reel spools that are reciprocative with respect to the reel body.

2. Description of Related Art

Typical spinning reels include a reel unit, a rotor, a spool, and a handle that is rotatively supported by the reel unit. The spinning-reel spool, which is reciprocative in that it shifts back and forth with respect to the reel unit, includes: a bobbin trunk onto which fishing line is wound; a front flange section disposed at the front end of, and having a larger diameter than, the bobbin trunk; and a tubular skirt portion provided at the rear of the bobbin trunk. The front flange section is fastened with a front-flange fixing member to the bobbin trunk.

Japanese Laid Open Pat. App. Nos. 49-5781 and 50-68889, for instance, disclose spools in which the bobbin trunk and the skirt portion are made unitarily from sheet metal, for example of an aluminum alloy, which serves to make the entire spool lighter.

In conventional spools thus formed from sheet metal, the bobbin trunk and the skirt portion are made to be thin. Therefore the strength of the bobbin trunk and skirt portion is diminished. Because the bobbin trunk is in particular subjected to large forces, diminishment in the bobbin trunk strength risks that the bobbin trunk will deform from line-winding.

SUMMARY OF THE INVENTION

An object of the present invention is to devise overall lightness of weight for spinning reel spools while maintaining the strength of the bobbin trunk.

Another object of the present invention is for spinning reel spools to devise a spool that is made lightweight and at the same time to suppress deformations thereof.

According to a first aspect of the present invention, a spinning reel spool that can be shifted back and forth with respect to a reel unit includes a tubular bobbin trunk for winding fishing line around its circumference, the bobbin trunk being made from a metal sheet; a skirt portion provided at a rear end of the bobbin trunk; and an inner barrel member fitted to an inner circumferential side of the bobbin trunk.

In such a spool, the bobbin trunk is made from a metal sheet, so that the spool can be made light. Moreover, an inner barrel member is fitted to an inner circumferential side of the bobbin trunk, so that the strength of the bobbin trunk can be maintained.

According to a second aspect of the present invention, in a spool as in the first aspect, the skirt portion is provided at a rear end of the bobbin trunk and is made from the metal sheet unitarily with the bobbin trunk. Thus, the bobbin trunk and the skirt portion are made unitarily from a metal sheet, so that the spool can be made lighter.

According to a third aspect of the present invention, a spool as in the first or second aspect further includes a front flange section provided at a front end of the bobbin trunk and having a diameter that is larger than the diameter of the bobbin trunk. Thus, the fishing line can be prevented from slipping off to the front, because a front flange section is provided at a front end of the bobbin trunk.

According to a fourth aspect of the present invention, in a spool as in the third aspect, the inner barrel member is made of a synthetic resin polymer. Thus, the spool can be made at low cost, while making the spool lighter.

According to a fifth aspect of the present invention, in a spool as in the third aspect, the inner barrel member is made of a light metal. Thus, the spool can be made lighter and stronger.

According to a sixth aspect of the present invention, in a spool as in the fifth aspect, the inner barrel member is made of an aluminum alloy, a titanium alloy or a magnesium alloy. Thus, the spool can be made lighter.

According to a seventh aspect of the present invention, in a spool as in the second aspect, the inner barrel member has an inner flange portion extending from a rear end of the inner barrel member along an inner side of the skirt portion. Thus, it is possible to position the inner barrel member axially with, for example, a inner flange portion that is disk-shaped or tubular, while preventing the inner barrel member from rotating by fastening the inner flange portion to the skirt portion. Furthermore, deformations of the bobbin trunk can be prevented by absorbing with the inner flange portion forces due to the winding of line that are exerted on the portion where the skirt portion rises. The inner flange portion can be provided unitarily with or separately from the inner barrel member.

According to an eighth aspect of the present invention, in a spool as in the third aspect, the inner barrel member is fastened to at least the bobbin trunk or the skirt portion by press fitting, gluing, fastening with screws or fastening with grooves.

In the case of press fitting, the inner barrel member can be fastened easily by press fitting, for example, the inner barrel member to the bobbin trunk, utilizing the elasticity of an inner barrel member made of a synthetic resin polymer. In case of gluing, the inner barrel member can be fastened tightly by applying an adhesive to the outer circumference of the inner barrel member, and gluing the inner barrel member to an inner circumferential side of the bobbin trunk, for example. In case of fastening with screws, the inner barrel member can be fastened easily by screwing the inner flange portion of the inner barrel member to the rising portion of the skirt portion, for example. In case of fastening with grooves, the inner barrel member can be fastened in a simple manner by placing the inner barrel member inside the bobbin trunk and simultaneously forming grooves in the bobbin trunk and the inner barrel member, for example by press-working thereby reducing their diameter.

According to a ninth aspect of the present invention, in a spool as in the first or second aspect, the bobbin trunk and the skirt portion are formed unitarily by press-working. Thus, it is easy to form the bobbin trunk and the skirt portion.

According to a tenth aspect of the present invention, in a spool as in the first to seventh aspects, the bobbin trunk and the skirt portion are made of an aluminum alloy, a stainless alloy, a titanium alloy or a magnesium alloy. If an aluminum alloy is used, processing the bobbin trunk and the skirt portion becomes easy, and they can be made at low cost. If a stainless alloy is used, it is possible to obtain a bobbin trunk and a skirt portion with high rigidity and to improve their corrosion resistance. If a titanium alloy is used, it is possible to obtain a bobbin trunk and a skirt portion with high rigidity and to make the bobbin trunk and the skirt portion lighter. If a magnesium alloy is used, it is possible to make the bobbin trunk and the skirt portion even lighter.

According to an eleventh aspect of the present invention, in a spool as in the first or second aspect, a plurality of groove portions extending in circumferential direction are formed in the outer peripheral surface of the bobbin trunk. Thus, the bobbin trunk can be strengthened with a plurality of groove portions formed in the outer peripheral surface of the bobbin trunk.

According to a twelfth aspect of the present invention, in a spool as in the 11th aspect, the circumferential groove portions in the bobbin trunk are formed by cutting, press-working or rolling. If the groove portions are formed by cutting, the groove portions can be formed with high precision while maintaining the strength. If the groove portions are formed by press-working, then the grooves can be formed easily by drawing, which is one kind of press-working, or by metal spinning. If the groove portions are formed by rolling, then the groove portions can be formed easily.

According to an thirteenth aspect of the present invention, in a spool as in the 11th or tenth aspects, the inner barrel member has a plurality of recesses extending in a circumferential direction in the outer peripheral surface, and the circumferential groove portions in the bobbin trunk are formed so as to fit into these recesses. Thus, the groove portions can be formed, for example, by forming a plurality of recesses in the outer peripheral surface of an inner barrel member made of a synthetic resin polymer, and subjecting the bobbin trunk to a press-working process, such as drawing, so as to match it to the shape of these recesses. In this case, the inner barrel member can be strengthened, because the recesses are formed in the inner barrel member.

According to a fourteenth aspect of the present invention, in a spool as in the third aspect, the front flange section is formed unitarily with the inner barrel member. Thus, the strength of the front flange section can be maintained, because the front flange section is formed unitarily with the inner barrel member. Moreover, the inner barrel member can be fastened to the bobbin trunk by sandwiching it between the front flange section and the inner flange portion.

According to a fifteenth aspect of the present invention, in a spool as in the third aspect, the front flange section is attached to the inner barrel member as a separate element. Thus, the front flange section and the inner barrel member can be formed as separate elements, and the front flange section can be detachable.

According to a sixteenth aspect of the present invention, in a spool as in the third aspect, the front flange section is made of an aluminum alloy, a stainless alloy, a titanium alloy or a magnesium alloy. If an aluminum alloy is used, processing the front flange section becomes easy, and it can be made at low cost. If a stainless alloy is used, it is possible to obtain a front flange section with high rigidity and to improve its corrosion resistance. If a titanium alloy is used, it is possible to obtain a front flange section with high rigidity and to make the front flange section lighter. If a magnesium alloy is used, it is possible to make the front flange section even lighter.

According to a seventeenth aspect of the present invention, in a spool as in the third aspects, the front flange section has been worked by curling. Thus, the front flange section can be strengthened.

According to an eighteenth aspect of the present invention, in a spool as in the 15th aspect, the front flange section is fastened by screwing it to the inner barrel member. Thus, the front flange section can be fastened easily to the inner barrel member.

According to a nineteenth aspect of the present invention, a spool as in the 15th aspect further includes a front-flange fixing member attached to the front end of the front flange section. Thus, the front flange section can be fastened to the inner barrel member by sandwiching it between the front-flange fixing member and the inner barrel member.

According to a twentieth aspect of the present invention, in a spool as in the 19th aspect, the front-flange fixing member is fastened by screwing it to the front flange section. Thus, the front-flange fixing member can be fastened easily to the front flange section.

According to a twenty-first aspect of the present invention, in a spool as in the 19th aspect, the front-flange fixing member is fastened by screwing it to the inner barrel member. Thus, the front-flange fixing member can be fastened easily to the inner barrel member. It is also possible to pass screws through the front flange section and screw the front-flange fixing member to the inner barrel member.

According to a twenty-second aspect of the present invention, a spool as in the first or second aspect further includes a folded portion, in which the rear end of the skirt portion is folded inward. Thus, the skirt portion can be strengthened.

According to a twenty-third aspect of the present invention, in a spool as in the 22nd aspect, the folded portion is formed by curling. Thus, the folded portion can be formed easily by a curling process, which is a simple plastic process.

According to a twenty-fourth aspect of the present invention, in a spool as in the first or second aspect, through-holes are formed by press-working through the outer peripheral surface of the skirt portion. Thus, the skirt portion can be made even lighter, and the through-holes can be made by relatively inexpensive press-working.

According to a twenty-fifth aspect of the present invention, in a spool as in the first or second aspect, the thickness of the metal sheet is not more than 1.5 mm. Thus, the press-working is easy to perform, because the sheet thickness is not more than 1.5 mm. It is preferable that the sheet thickness is at least 0.6 mm and at most 1.0 mm. When the sheet thickness is at least 0.6 mm and at most 1.0 mm, the effect of making the spool is particularly striking.

According to a twenty-sixth aspect of the present invention, in a spool as in the fourth aspect further includes a metal reinforcement member attached to the inner barrel member.

With such a spool made from a metal sheet, making the bobbin trunk thin leads to a lower strength of the bobbin trunk. In the fourth aspect, an inner barrel member made of a synthetic resin polymer is fitted to an inner circumferential side of the bobbin trunk to strengthen the bobbin trunk. In this case, fitting an inner barrel member inside the bobbin trunk makes it possible to maintain the strength of the bobbin trunk while making the bobbin trunk lighter. However, when the inner barrel member is made of a synthetic resin polymer and a large pressure is exerted on the bobbin trunk, for example due to the winding of fishing line, then there is the danger that the inner barrel member is deformed together with the bobbin trunk.

In this case, a metal reinforcement member is attached to the inner barrel member. Thus, the strength of the inner barrel member can be maintained at a high level with a reinforcement member, such as a washer. Consequently, it is possible to suppress deformations of the spool when a large pressure is exerted on the bobbin trunk.

According to a twenty-seventh aspect of the present invention, in a spool as in the 26th aspect, the reinforcement member is a annular metal member. Thus, costs can be lowered by using as the annular metal member, for example, a common ring-shaped flat washer.

According to a twenty-eighth aspect of the present invention, in a spool as in the 26th aspect, the reinforcement member is attached to a front end of the inner barrel member. Thus, it is possible to strengthen particularly the front end of the inner barrel member.

According to a twenty-ninth aspect of the present invention, in a spool as in the 28th aspect, the reinforcement member is attached between the front flange section and the front end of the inner barrel member. A large pressure is exerted on the front flange section when the fishing line is stuck between the bobbin trunk and the front flange section for example, so that the pressure on the front flange section may deform the inner barrel member. Here, however, the reinforcement member is attached between the front flange section and the front end of the inner barrel member, so that deformations of the inner barrel member can be suppressed.

According to a thirtieth aspect of the present invention, in a spool as in the 26th aspect, the reinforcement member is attached to a rear end of the inner barrel member. Thus, it is possible to maintain in particular the strength of the rear end of the inner barrel member at a high level.

According to a thirty-first aspect of the present invention, in a spool as in the 26th aspect, the inner barrel member further comprises a bottom portion defining a space that is open to the front, and the reinforcement member is attached to the bottom portion of the inner barrel member. Thus, the strength of the inner barrel member can be increased by attaching the reinforcement member at the bottom portion of a space for accommodating a drag mechanism, for example.

According to a thirty-second aspect of the present invention, in a spool as in the 31st aspect, said space accommodates a drag mechanism for braking the spool, and the reinforcement member serves as a washer for the drag mechanism. Thus, the washer for the drag mechanism and the reinforcement member can be provided as one element.

According to a thirty-third aspect of the present invention, in a spool as in the 26th aspect, the reinforcement member is fastened to the inner barrel member by at least one of press fitting, gluing, welding, fastening with screws and fastening with push nuts. Thus, the reinforcement member can be fastened in a simple and reliable manner.

According to a thirty-fourth aspect of the present invention, in a spool as in the twenty-sixth aspect, a fitting portion, into which the front end of the bobbin trunk is fitted, is formed in the front flange section. This increases the strength of the bobbin trunk in being fitted into the front flange section.

According to a thirty-fifth aspect of the present invention, in a spool as in the third aspect, bobbin trunk includes a tubular portion made from the metal sheet for winding fishing line around its circumference, and an inner flange portion formed unitarily with the tubular portion and having a front portion that extends toward an inner circumference.

In such a spool, the bobbin trunk includes a tubular portion made from a metal sheet and an inner flange portion formed where a front portion of the tubular portion extends toward an inner circumference. Thus, the strength of the bobbin trunk can be maintained at a high level, because the bobbin trunk can be provided with, for example, an inner flange portion shaped like a cylinder having a bottom. Consequently, it is possible to suppress deformations of the spool when a large pressure is exerted on the bobbin trunk.

According to a thirty-sixth aspect of the present invention, in a spool as in the 35th aspect, the inner flange portion has an engaging portion, and the inner barrel member has a counter-engaging member that engages with the engaging member and keeps the inner flange portion from rotating. Thus, it is possible to form, for example, a through-hole as the engaging portion in the inner flange member, form a protrusion as the counter-engaging portion in the inner barrel member, and position the inner barrel member and prevent the inner barrel member from rotating by engaging the engaging portion with the counter-engaging portion.

According to a thirty-seventh aspect of the present invention, in a spool as in the 35th aspect, the inner flange portion and the inner barrel member are fastened together to the front flange section. Thus, it is possible to reduce the number of components, such as bolts, used as fastening members.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

First Embodiment

Figure 1:
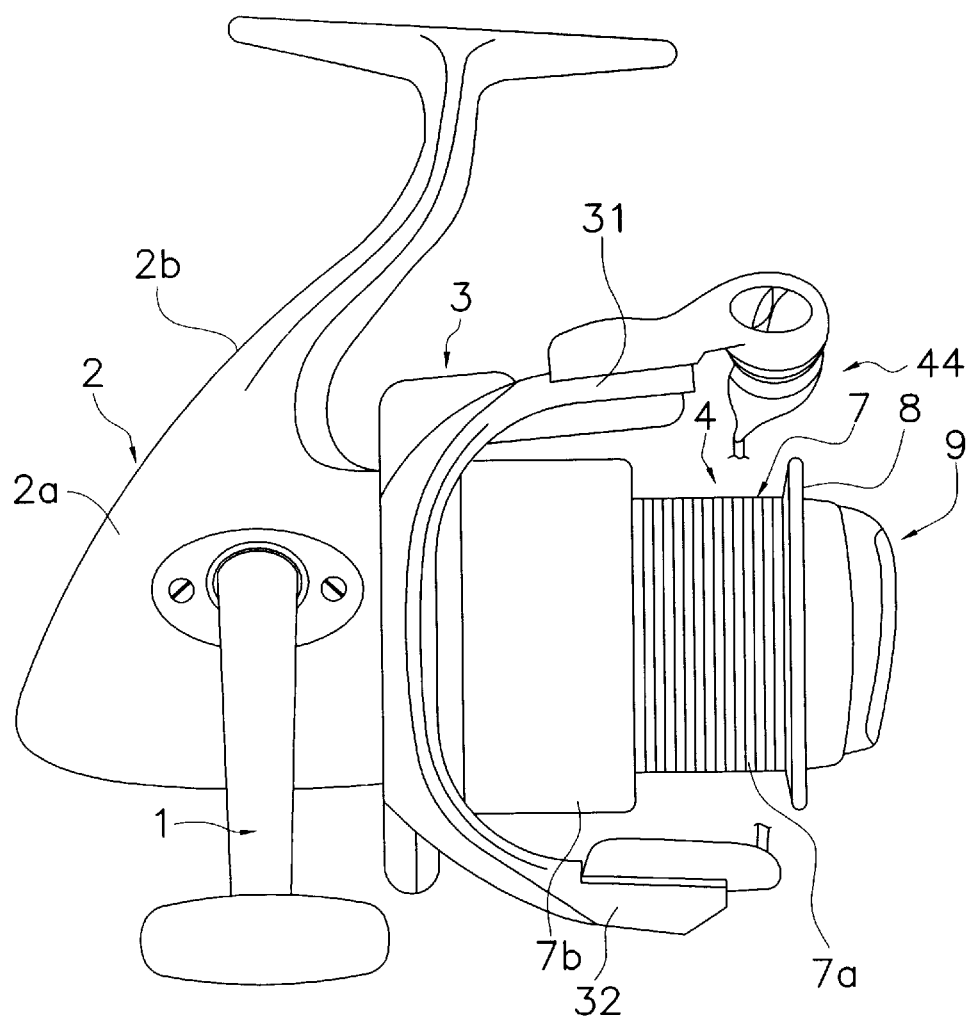
FIG. 1 is a right-side elevational view of a spinning reel in accordance with a first embodiment of the present invention.

As shown in FIG. 1, a spinning reel in accordance with a first embodiment of the present invention includes a reel unit 2, a rotor 3, a spool 4, and a handle 1 rotatively supported by the reel unit 2. The rotor 3 is rotatively supported at the reel unit front. Fishing line is wound around the outer peripheral surface of the spool 4, which is reciprocatingly disposed on the front of the rotor 3.

Figure 2:
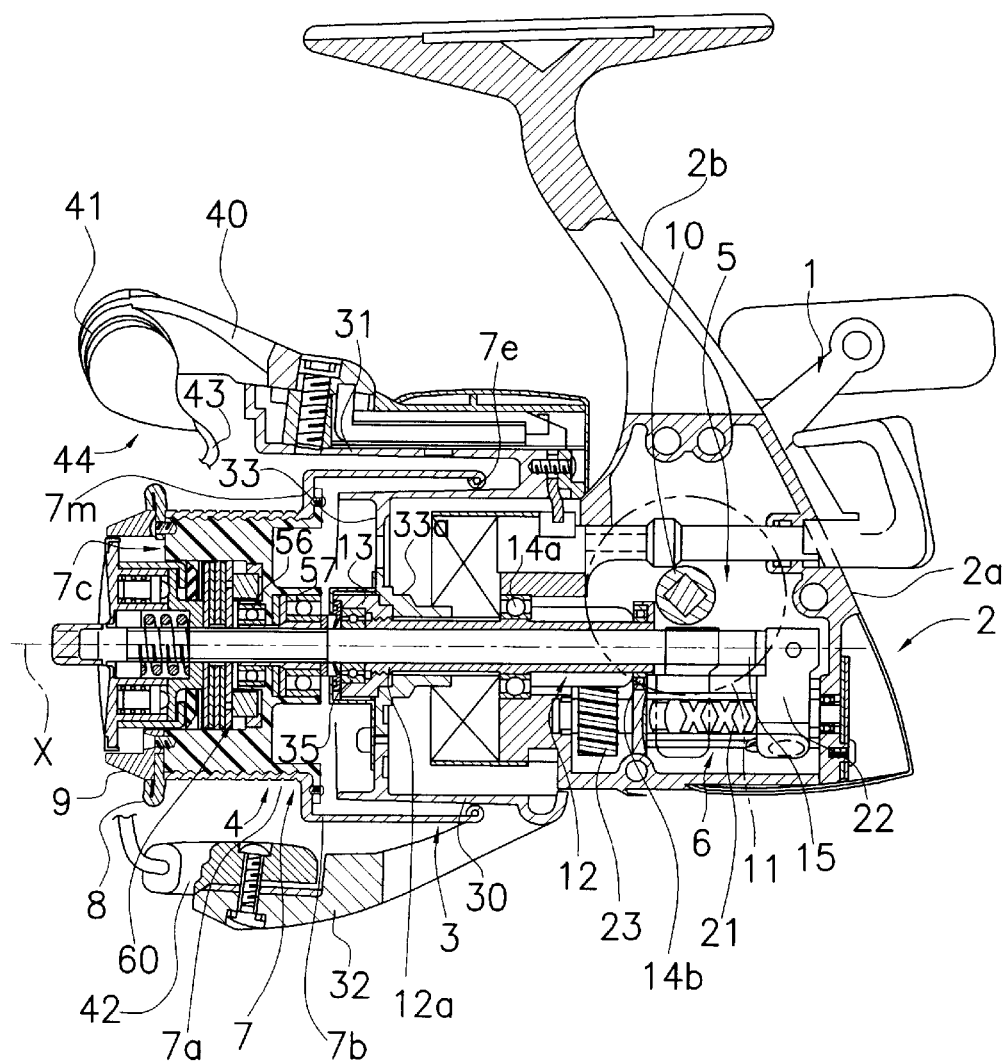
FIG. 2 is a left side, partly in section view of the spinning reel in FIG. 1.

The reel unit 2 includes a reel body 2a and a rod attachment leg 2b extending diagonally-upward to the front from the reel body 2a. As shown in FIG. 2, the reel body 2a has a space inside, which accommodates a rotor driving mechanism 5 and an oscillating mechanism 6. The rotor driving mechanism 5 transmits the rotation of the handle 1 to rotate the rotor 3. The oscillating mechanism 6 reciprocates the spool 4 to wind fishing line onto it uniformly.

The rotor driving mechanism 5 includes a face gear 11 and a pinion gear 12. The face gear 11 rotates together with a handle shaft 10 to which the handle 1 is fixed. The pinion gear 12 meshes with the face gear 11. The pinion gear 12 is tubular, and its front portion 12a penetrates the center of the rotor 3 and is fixed by a nut 13 to the rotor 3. The middle and the rear end of the pinion gear 12 are rotatively supported by bearings 14a and 14b in the reel unit 2.

The oscillating mechanism 6 reciprocates the spool shaft 15, which is linked to the middle portion of the spool 4 via a drag mechanism 60, thereby also reciprocating the spool 4. The oscillating mechanism 6 includes a threaded shaft 21, a slider 22, and an intermediate gear 23. The threaded shaft 21 is arranged below the spool shaft 15 and in parallel thereto. The slider 22 moves back and forth along the threaded shaft 21, to the front end of which the intermediate gear 23 is fixed. The rear end of the spool shaft 15 is fixed non-rotatively to the slider 22. The intermediate gear 23 meshes with the pinion gear 12.

As shown in FIG. 2, the rotor 3 includes a cylindrical member 30, and first and second rotor arms 31 and 32, which are disposed in opposition to one another at the sides of the cylindrical member 30. The cylindrical member 30 and the two rotor arms 31 and 32 can be made, for example, of an aluminum alloy, and are formed unitarily.

A front wall 33 is formed at the front of the cylindrical member 30, and a boss portion 33a is formed at the center of the front wall 33. In the center of the boss portion 33a, a through-hole is formed, through which a front portion 12a of the pinion gear 12 and the spool shaft 15 are passed. A nut 13 is disposed on the front of the front wall 33, and a bearing 35, which rotatively supports the spools shaft 15, is arranged inside the nut 13.

The first rotor arm 31 bends in a bulge outward from the cylindrical member 30 and extends forward, and the section in which it is connected to the cylindrical member 30 describes a curve that widens in the circumferential direction of the cylindrical member 30. A pivotable first bail support member 40 is provided on the outer peripheral side of the tip of the first rotor arm 31. A line roller 41 for guiding fishing line onto the spool 4 is disposed on the end of the first bail support member 40.

The second rotor arm 32 bends in a bulge outward from the cylindrical member 30 and extends forward. The second rotor arm 32, from its tip end toward the section where it is connected to the cylindrical member 30, branches into two thighs, and is joined to the cylindrical member 30 in two circumferentially spaced places. A pivotable second bail support member 42 is provided to the inner peripheral side of the tip of the second rotor arm 32.

A bail 43 in the form of a wire bent into a roughly U-shape is fixed between the line roller 41 and the second bail support member 42. The first and second bail support members 40 and 42, the line roller 41 and the bail 43 constitute a bail arm 44 guiding the fishing line to the spool 4. The bail arm 44 is pivotable between a line-guiding posture shown in FIG. 2 and a reversed line-release posture.

The spool 4 is arranged between the first rotor arm 31 and the second rotor arm 32 of the rotor 3, and is disposed at the end of the spool shaft 15 with the drag mechanism 60 interposed between the spool shaft 15 and the spool 4. The spool 4 includes a spool main section 7, a larger diameter front flange section 8, and a front-flange fixing member 9. The spool main section 7 has: a tubular bobbin trunk 7a around which fishing line is wound; a larger diameter tubular skirt portion 7b formed unitarily on the rear end of the bobbin trunk 7a; and an inner barrel member 7c made of a synthetic resin polymer, which is attached to the inner circumferential side of the bobbin trunk 7a. The skirt portion 7b has a rear flange portion 7m that is formed unitarily on a rear end of the bobbin trunk 7a, and a tubular portion 7n that is formed unitarily on a rear end of the rear flange portion 7m. The rear flange portion 7n has a substantially equal thickness. The front flange section 8 is attached to the front end of the bobbin trunk 7a. The front-flange fixing member 9 fastens the front flange section 8 to the spool main section 7.

The bobbin trunk 7a and the skirt portion 7b are a dual larger-smaller stage tubular element that is obtained by unitary molding from a process of press-working a sheet of an aluminum alloy. The thickness of this sheet is 1.5 mm or less, preferably 0.6 mm or more, 1.0 mm or less.

Figure 3:
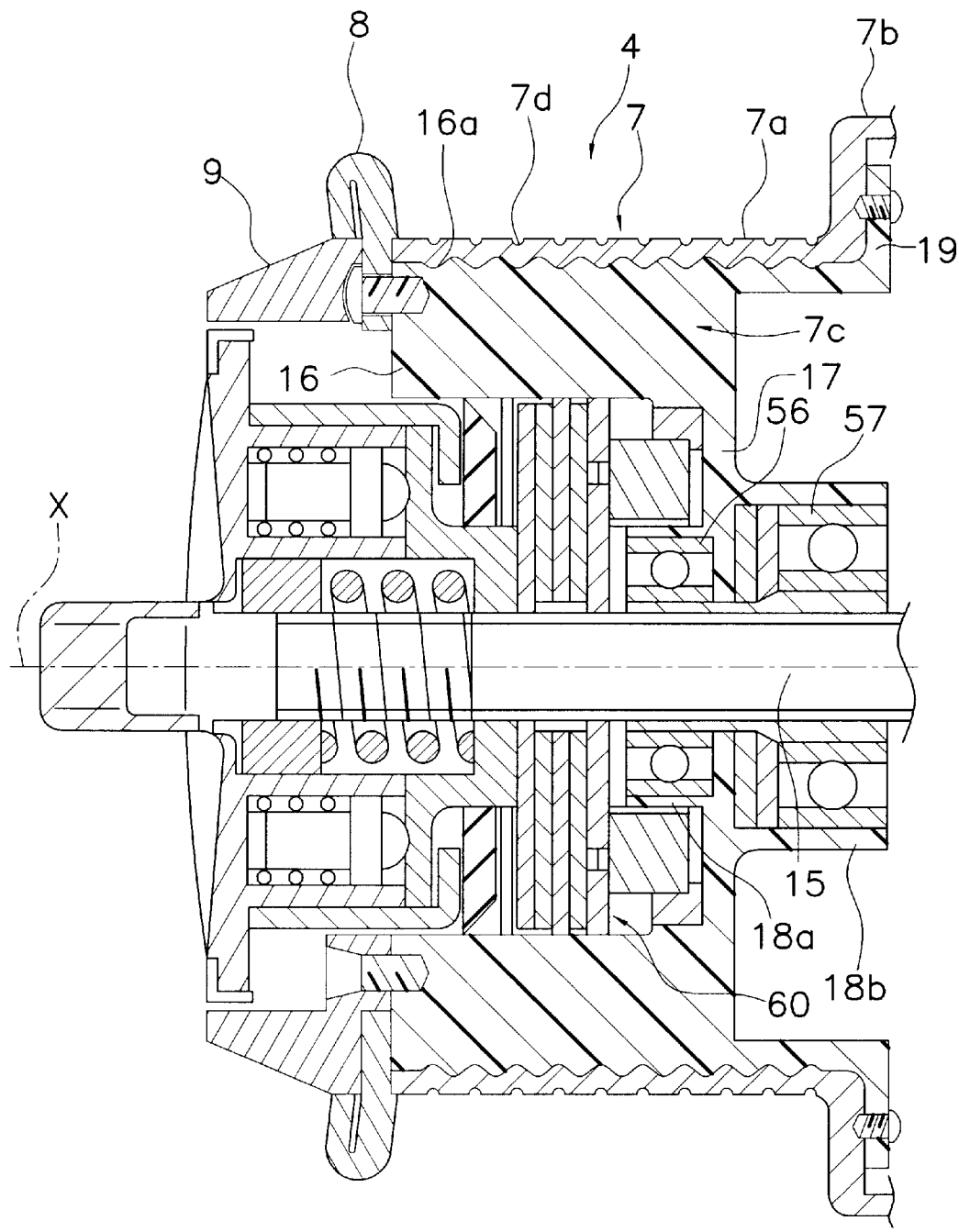
FIG. 3 is an enlarged fragmentary sectional view of the spool from the spinning reel in FIG. 2.

The inner barrel member 7c is attached to the inner circumferential side of the bobbin trunk 7a, and is made of synthetic resin polymer. As shown enlarged in FIG. 3, the inner barrel member 7c includes a main cylindrical portion 16, a circular plate portion 17, a pair of boss portions 18a and 18b, and an inner flange portion 19. The main cylindrical portion 16 accommodates the drag mechanism 60. The circular plate portion 17 is formed unitarily with the main cylindrical portion 16 on its inner circumferential side. The pair of boss portions 18a and 18b is formed on the inner circumferential side of the circular plate portion 17. The inner flange portion 19 is formed on the rear end of the main cylindrical portion 16. Two bearings 56 and 57 are provided inside the boss portions 18a and 18b. Through the two bearings 56 and 57, the spool main section 7 is mounted rotatively to the spool shaft 15.

A plurality of recesses 16a running circumferentially is formed on the outer periphery of the main cylindrical portion 16. These recesses 16a are provided for attaching the tubular bobbin trunk 7a to the outer periphery of the main cylindrical portion 16, and for the sake of forming, by a press operation such as spinning, a plurality of grooves 7d matching the shape of the recesses 16a. Forming these groove portions 7d in the bobbin trunk 7a elevates the strength of the bobbin trunk 7a. Furthermore, threaded holes for screw fastening the front flange section 8 and the front-flange fixing member 9 are formed in a plurality of respective locations in the front-end side of the main cylindrical portion 16.

The inner flange portion 19 is formed unitarily with the rear end of the main cylindrical portion 16 and extends along the inner side of the standing section of the skirt portion 7b. Threaded holes for screw fastening the inner flange portion 19 to the skirt portion 7b are formed in a plurality of locations in the inner flange portion 19. The inner barrel member 7c is kept from rotating by screw fastening the inner flange portion 19 to fix it to the skirt portion 7b.

The skirt portion 7b is press-formed unitarily with the bobbin trunk 7a so as to cover the cylindrical member 30 of the rotor 3. As shown in FIG. 2, a beaded (folded) portion 7e that is folded over onto the inner peripheral side, is formed at the rear end of the skirt portion 7b. The beaded portion 7e is formed by curling, and the strength of the skirt portion 7b is raised by forming this hemmed portion 7e.

The front flange section 8 is an annular member formed by curling a pressed sheet of a stainless alloy. The front flange section 8 is screw-fixed to the main cylindrical portion 16, and the inner barrel member 7c is fixed axially by being grasped between the front flange section 8 and the inner flange portion 19.

Fixed with screws to the main cylindrical portion 16, the front-flange fixing member 9 together with the front end of the bobbin trunk 7a sandwiches the front flange section 8. The female threaded holes in the front-flange fixing member 9 are arranged in different positions from the threaded holes in the front flange section 8.

In this spool 4, the bobbin trunk 7a and the skirt portion 7b are made unitarily of an aluminum alloy sheet, which makes the spool 4 lightweight. Furthermore, an inner barrel member 7c is fitted to the inner circumferential side of the bobbin trunk 7a, which sustains the strength of the bobbin trunk 7a.

First Embodiment Modifications (a) In the first embodiment, the bobbin trunk 7a and the skirt portion 7b are made of an aluminum alloy. However, the embodiment is not thereby limited and the bobbin trunk 7a and the skirt portion 7b can also be made of stainless alloys, titanium alloys or magnesium alloys.

(b) In the first embodiment, the inner barrel member 7c is made of a synthetic resin polymer, but it can also be made of a light metal, such as an aluminum alloy, a titanium alloy, or a magnesium alloy.

(c) In the first embodiment, the groove portions 7d are formed by a press-working operation, such as drawing, but it is also possible to form the grooves 7d by other methods, such as cutting or rolling.

(d) In the first embodiment, the front flange section 8 is made of a stainless alloy. However, the embodiment is not thereby limited and the front flange section 8 can also be made of an aluminum alloy, a titanium alloy or a magnesium alloy.

(e) In the first embodiment, the inner barrel member 7c is fixed by screw fastening, but it can also be fixed by press fitting, gluing or by setting in grooves.

Figure 4:
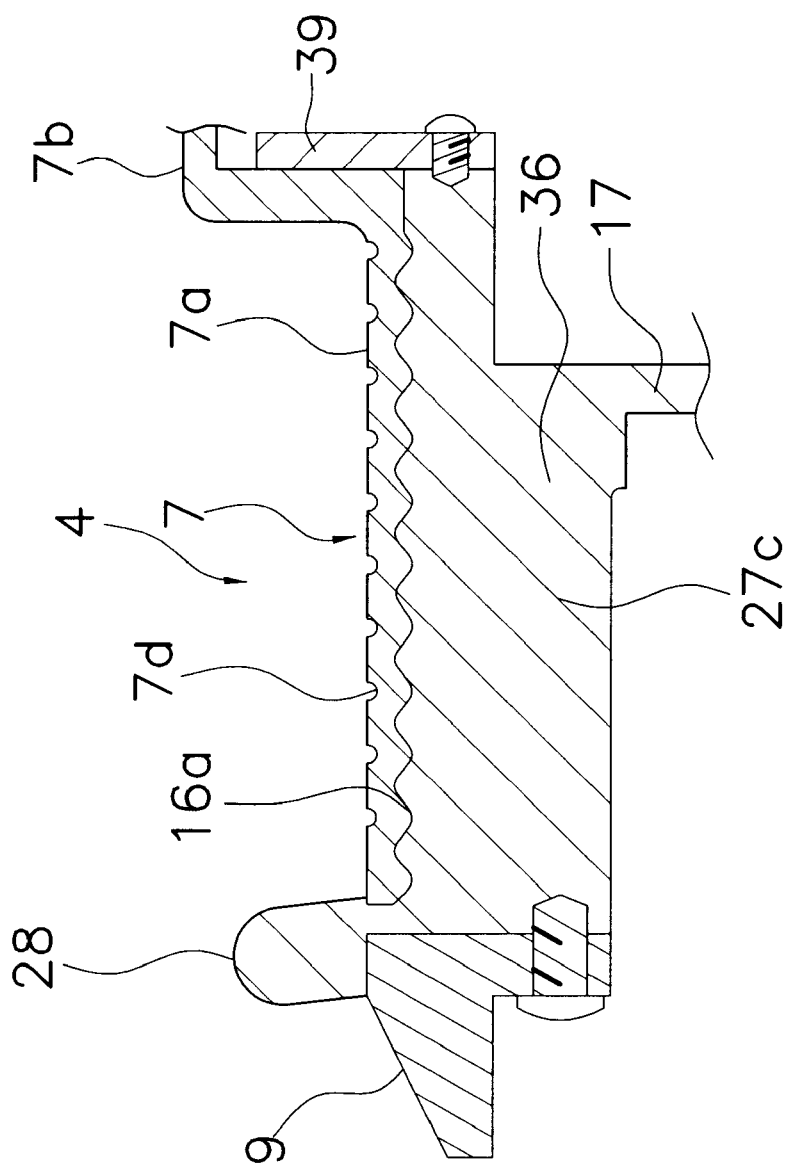
FIG. 4 is an enlarged fragmentary sectional view illustrating a detail of a spool corresponding to that as depicted in FIG. 3, in a modification of the first embodiment.
Figure 5:
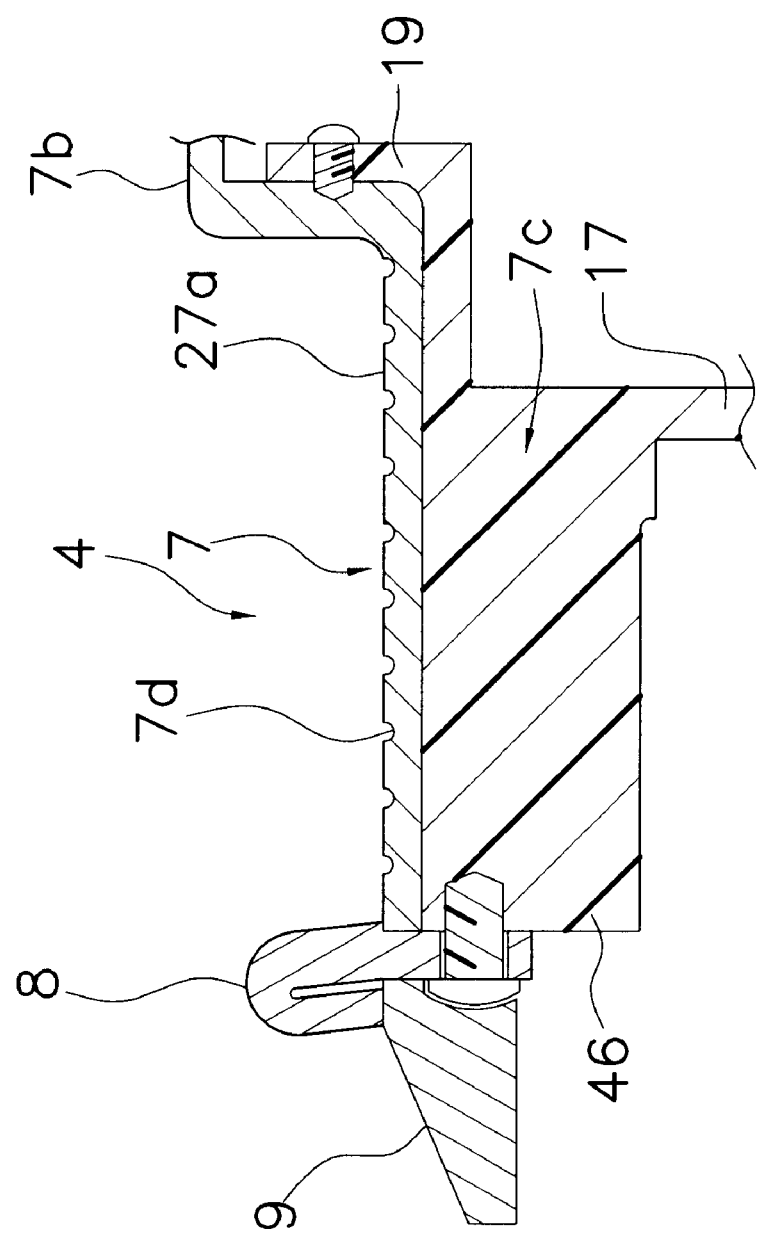
FIG. 5 is an enlarged fragmentary sectional view corresponding to FIG. 4 of yet another modification.

(f) In the first embodiment, the front flange section 8 is attached to the inner barrel member 7c as a separate element, but as shown in FIG. 4, it is also possible to form the front flange section 28 and the inner barrel member 27c as one element, and form the main cylindrical portion 36 and the inner flange portion 39 as separate elements. It is also possible to screw the front-flange fixing member 9 to the front flange section 8. As shown in FIG. 5, it is also possible to provide the outer peripheral surface of the main cylindrical portion 46 not with recesses but with a smooth circumferential surface, and to fasten it to the inner circumferential surface of the bobbin trunk 27a, for example, by press fitting or gluing.

Figure 6:
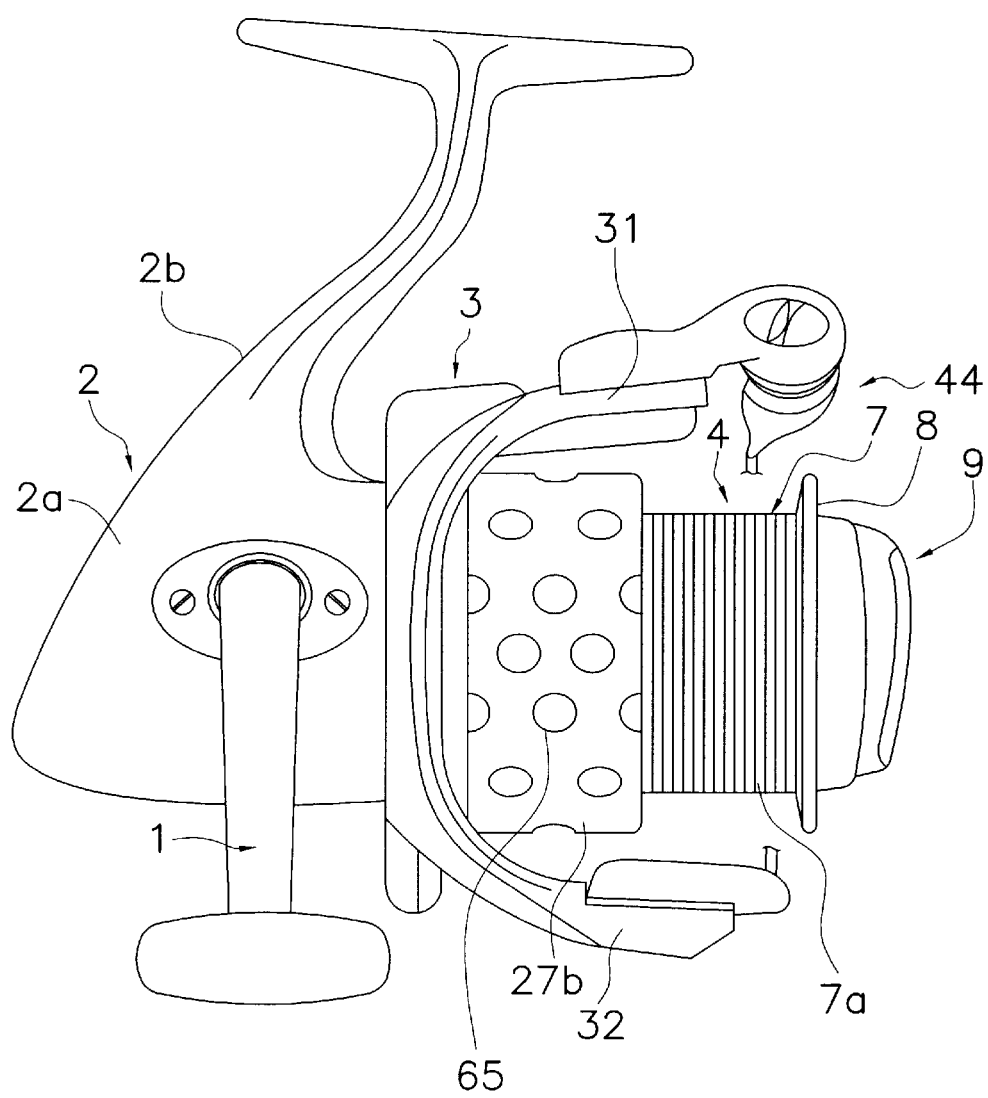
FIG. 6 is a view corresponding to FIG. 1 of yet another modification.

(g) As shown in FIG. 6, a plurality of through-holes 65 may be formed through the outer peripheral surface of the skirt portion 27b by press-working.

Second Embodiment

In the first embodiment, the inner barrel member 7c is provided in the inner circumferential side of the bobbin trunk 7a of spool to suppress deformation of the bobbin trunk 7a. However, in the second embodiment, a reinforcement member is provided to suppress deformation of an inner barrel member. In the explanation hereinafter, description with regard to configurations and operations in common with the first embodiment will be omitted.

Figure 7:
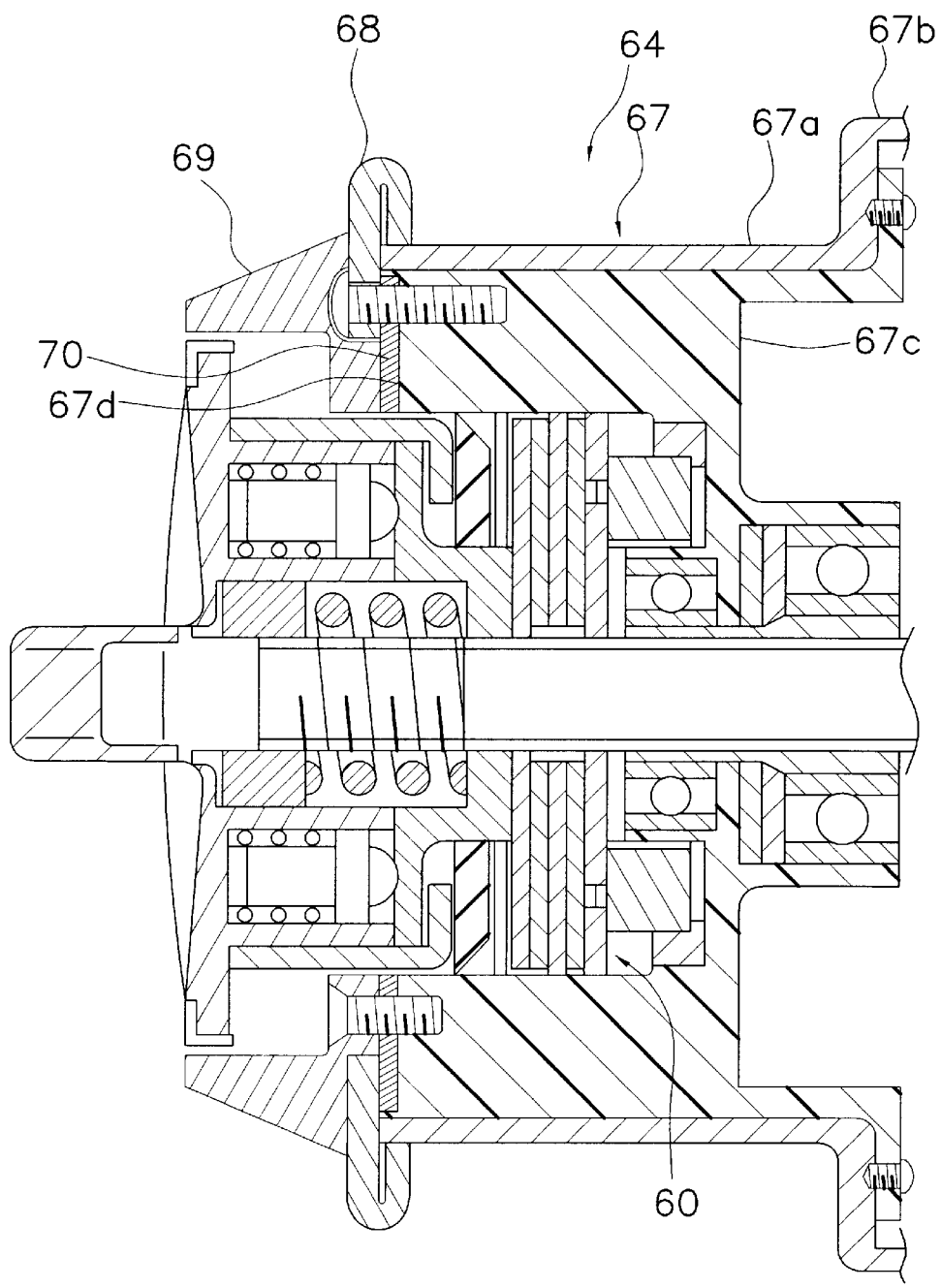
FIG. 7 is a view corresponding to FIG. 3 of a second embodiment.

As shown in FIG. 7, a spool 64 in accordance with a second embodiment of the present invention includes a spool main section 67, a front flange section 68, and a front-flange fixing member 69. The spool main section 67 has a tubular bobbin trunk 67a around which the fishing line is wound, a larger diameter tubular skirt portion 67b that is formed unitarily with the rear end of the bobbin trunk 67a, and an inner barrel member 67c made of a synthetic resin polymer, which is fitted to the inner circumferential side of the bobbin trunk 67a. The front flange section 68 has a larger diameter and is attached to the front end of the bobbin trunk 67a. The front-flange fixing member 69 fastens the front flange section 68 to the spool main section 67. A metal reinforcement member 70 is disposed between the front end of the inner barrel member 67c and the front flange section 68.

The bobbin trunk 67a and the skirt portion 67b are a dual larger-smaller stage tubular element that is obtained by unitary molding from a process of press-working a sheet of an aluminum alloy.

The inner barrel member 67c, which is attached to the inner circumferential side of the bobbin trunk 67a, is a tubular element from synthetic resin polymer, to which the drag mechanism 60 is fitted. Threaded holes for screwing fast the front flange section 68 and the front-flange fixing member 69 are formed at a plurality of locations in the front end of the inner barrel member 67c. Furthermore, an annular recess 67d is formed in the front-end portion of the inner barrel member 67c, and the reinforcement member 70 is fitted into the recess 67d with its outer circumferential surface and its base surface adhered to the recess 67d.

The front flange 68 is an annular member made of a stainless alloy that has been subjected to a curling process and folded over rearward. The front flange section 68 is screw fastened to the inner barrel member 67c.

Fixed with screws to the inner barrel member 67c, the front-flange fixing member 69 together with the front end of the bobbin trunk 67a sandwiches the front flange section 68. The threaded holes in the front-flange fixing member 69 are arranged in different positions from the threaded holes of the front flange section 68.

The reinforcement member 70 can be, for example, a flat ring-shaped metal member, such as a washer. Through-holes communicating the threaded holes in the inner barrel member 67c, the front flange section 68, and the front-flange fixing member 69 are formed in a plurality of locations in the reinforcement member 70.

In this spool 64, because a metal reinforcement member 70 is attached to the inner barrel member 7c the strength of the inner barrel member 7c is highly maintained.

Second Embodiment Modifications (a) In the second embodiment, the reinforcement member 70 is fixed to the inner barrel member 67c by screw fastening. However, the embodiment is not thereby limited, and it can also be fastened by press fitting, gluing or welding or the like.

Figure 8:
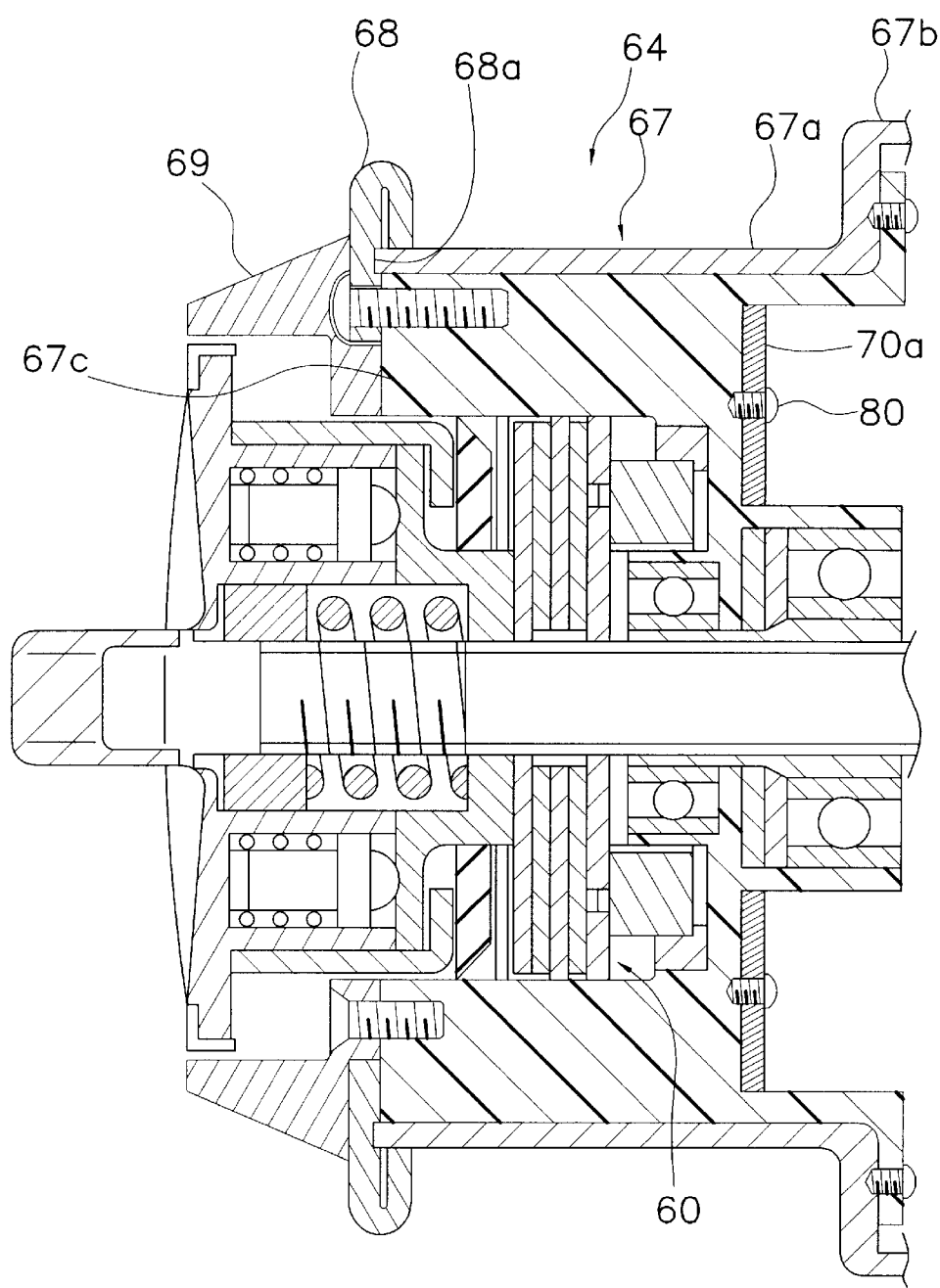
FIG. 8 is a view corresponding to FIG. 3 in a modification of the second embodiment.

(b) In the second embodiment, the metal reinforcement member 70 is attached to the front end of the inner barrel member 67c, but as shown in FIG. 8, the reinforcement member 70a can also be screwed with bolts 80 to the rear end of the inner barrel member 67c.

Figure 9:
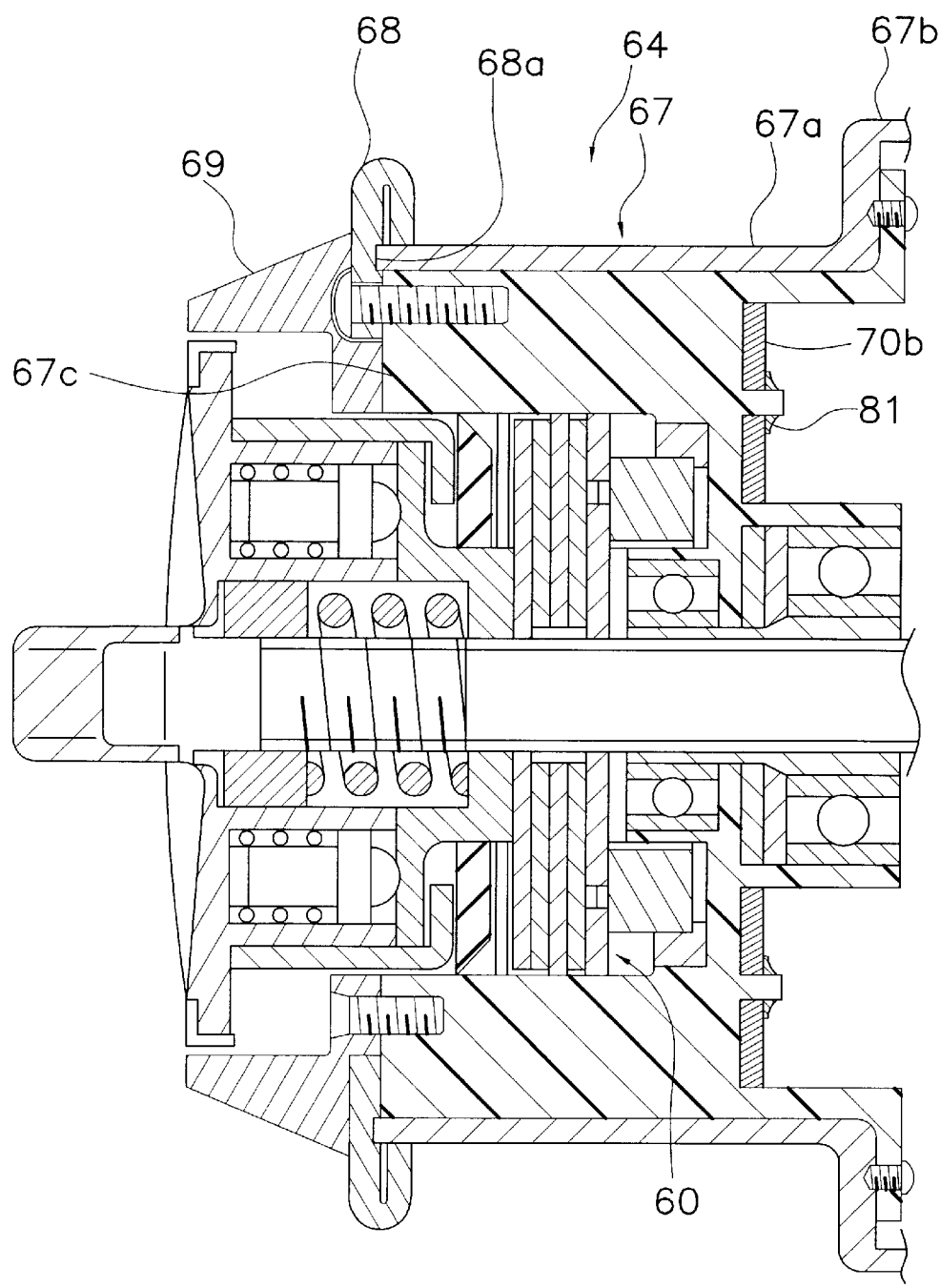
FIG. 9 is a view corresponding to FIG. 3 of yet another modification.

Moreover, as shown in FIG. 9, it is also possible to form protrusions on the rear end of the inner barrel member 67c to fasten the metal reinforcement member 70b with push nuts 81.

Figure 10:
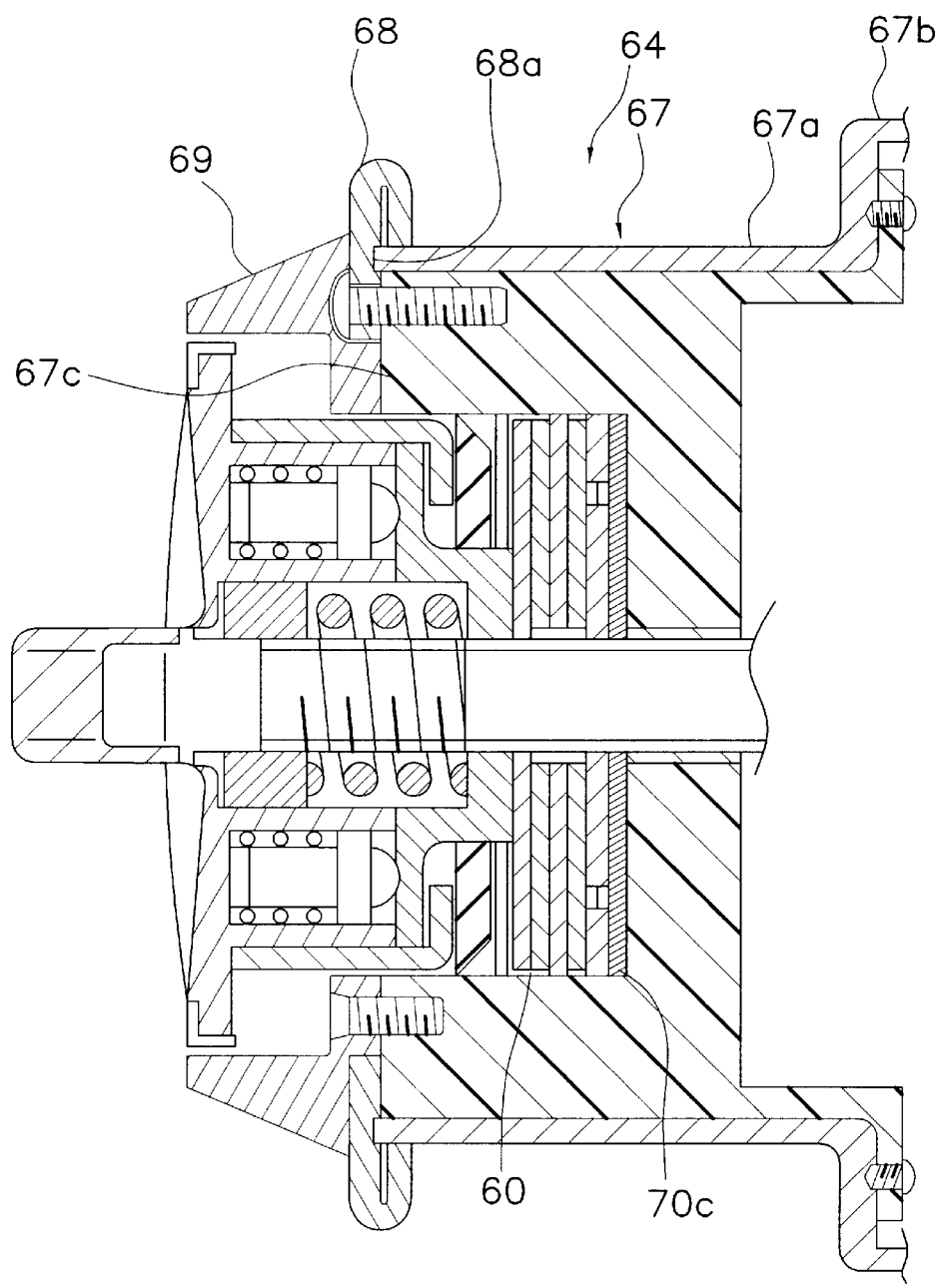
FIG. 10 is a view corresponding to FIG. 3 of yet another modification.

(c) As shown in FIG. 10, it is also possible to attach the reinforcement member 70c non-rotatively to an inner peripheral base portion of the inner barrel member 7c, so that it serves also as a washer for the drag mechanism 60. In this case, the reinforcement member 70c is a lug washer having protrusions on its outer periphery (not shown in the drawing) for interlocking.

(d) As shown in FIGS. 8 to 10, it is also possible to form an annular fitting hole 68a in the front flange 68 to fit the front end of the bobbin trunk 67a into this fitting hole 68a. If the sheet thickness of the bobbin trunk is 1.5 mm or less, preferably at least 0.6 mm and at most 1.0 mm, then it is preferable that the groove depth of the fitting hole 68a is approximately 0.5 mm, and the groove width is at least 0.6 mm and at most 1.0 mm, for example approximately 0.8 mm.

Third Embodiment

In the second embodiment, providing the reinforcement member 70 reinforces the synthetic polymer inner barrel member 67c, which furthermore reinforces the bobbin trunk 67a. In the third embodiment, however, a flange portion 77e is formed at the lead end of the bobbin trunk 77a, elevating the strength of the bobbin trunk 77a.

Figure 11:
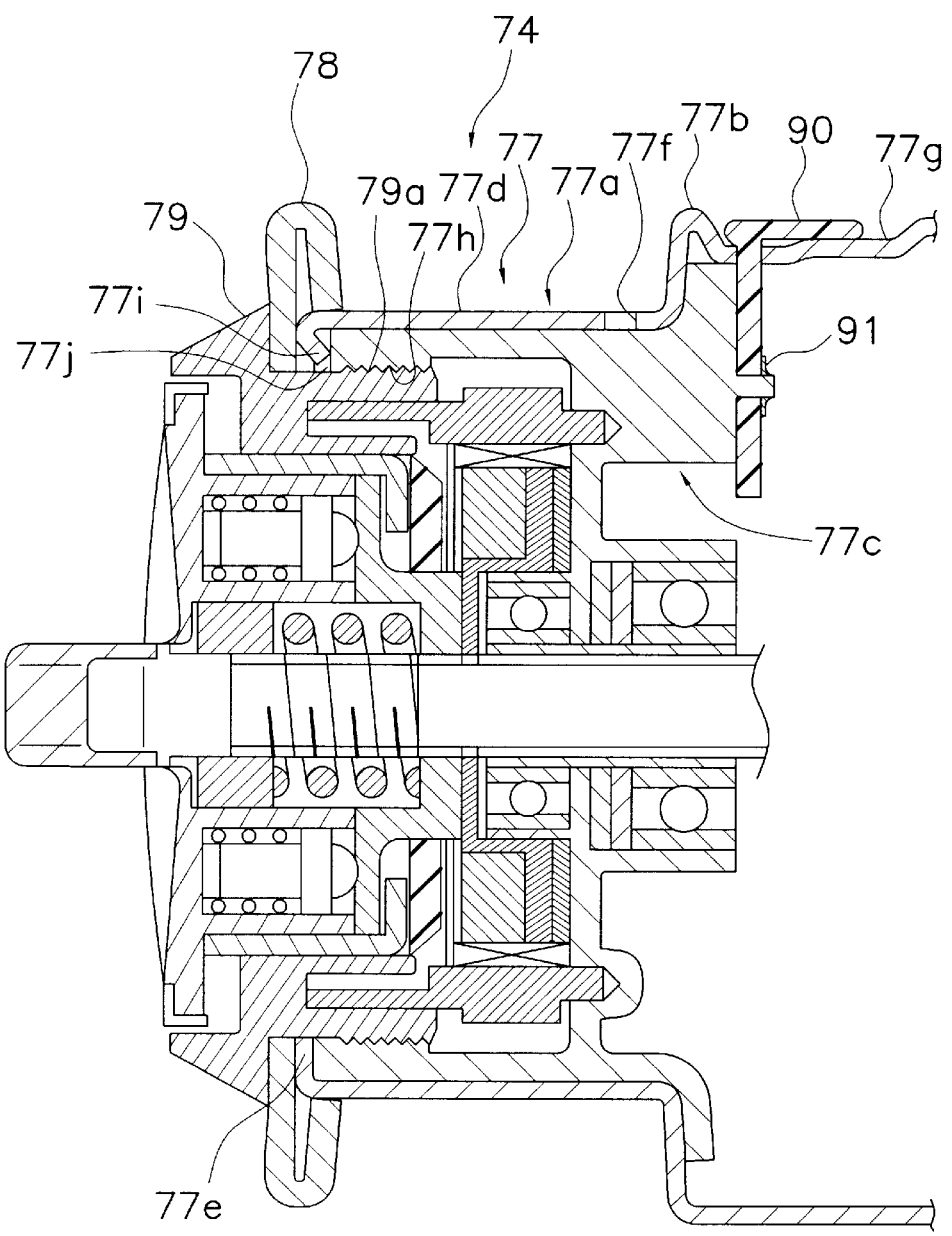
FIG. 11 is a view corresponding to FIG. 3 of a third embodiment.

As shown enlarged in FIG. 11, the spool 74 in accordance with a third embodiment of the present invention includes a spool main section 77, a front flange section 78, and a front-flange fixing member 79. The spool main section 77 has: a tubular bobbin trunk 77a around which the fishing line is wound; a larger diameter tubular skirt portion 77b formed unitarily with the rear end of the bobbin trunk 77a; and an inner barrel member 77c, which is fitted to the inner circumferential side of the bobbin trunk 77a. The front flange section 78 has a larger diameter and is attached to the front end of the bobbin trunk 77a. The front-flange fixing member 79 fastens the front flange section 8 to the spool main section 77.

The bobbin trunk 77a and the skirt portion 77b are a dual larger-smaller stage tubular element that is obtained by unitary molding from a process of press-working a sheet of an aluminum alloy.

The bobbin trunk 77a includes a tubular portion 77d around which the fishing line is wound, and an inner flange portion 77e that is formed unitarily with the front end of the tubular portion 77d. A through-hole 77f for accommodating a knot at the wind-starting end of the fishing line is formed in the tubular portion 77d near the skirt portion 77b (see FIG. 11).

As shown in FIG. 11, a stepped recess 77g is formed in the skirt portion 77b, and a fishing-line catch 90 for catching the leading end of the fishing line is fitted in this recess 77g. A gap in which fishing line can be held is formed between the recess 77g and the fishing-line-interlocking portion 90. As shown in FIG. 11, the lateral cross-section of the fishing-line catch 90 is substantially T-shaped, and the fishing-line catch 90 can be elastically deformed. The fishing-line catch 90 is fastened with a push nut 91 attached to a protrusion formed at the rear end of the inner barrel member 77c.

The inner barrel member 77c is attached to the inner circumferential side of the bobbin trunk 77a, and is a tubular element from an aluminum alloy, made by die-casting, to which the drag mechanism is fitted. The fishing-line catch 90 is attached to the rear end of the inner barrel member 77c, which is fastened with screws to the skirt portion 77b. In a plurality of locations in the front end of the inner barrel member 77c counter-engagers 77j are formed, into which later-described engagers 77i, formed on the inner flange portion 77e, engage. Further, female threads 77h, into which male threads 79a formed on a later-described front-flange fixing member 79 are screw-mated, are formed on the inner peripheral side of the inner barrel member 77c.

The inner flange portion 77e is formed by press-working to fold over inward, so that it contacts the front end of the inner barrel member 77c. The inner flange portion 77e is grasped between the front end of the inner barrel member 77c and the front flange section 78. Further, the engagers 77i are folded further inward, so as to engage with the counter-engagers 77j formed in the inner barrel member 77c, and made in a plurality of locations on the inner flange portion 77e. Engaging the engagers 77i with the counter-engagers 77j positions the inner flange portion 77e, and stops it from turning, with respect to the inner barrel member 77c.

The front flange 78 is an annular member made of an aluminum alloy that has been subjected to a curling process and is folded over to the rear. Screwing in the front-flange fixing member 79 to fix it to the inner barrel member 77c, clamps the front flange section 78 between the front end of the inner flange portion 77e and the front-flange fixing member 79.

The front-flange fixing member 79 is a cylindrical member with a conically shaped front portion, and male threads 79a are formed on its rear outer periphery. Screw-mating the male threads 79a into the female threads 77h of the inner barrel member 77c, screws in the front-flange fixing member 79 to fix it to the inner barrel member 77c.

In the spool 74 thus, because an inner flange portion 77e in which the front end of the bobbin trunk 77a is folded inward, is formed unitarily on the bobbin trunk 77a, the strength of the bobbin trunk 77a is highly maintained.

Figure 12:
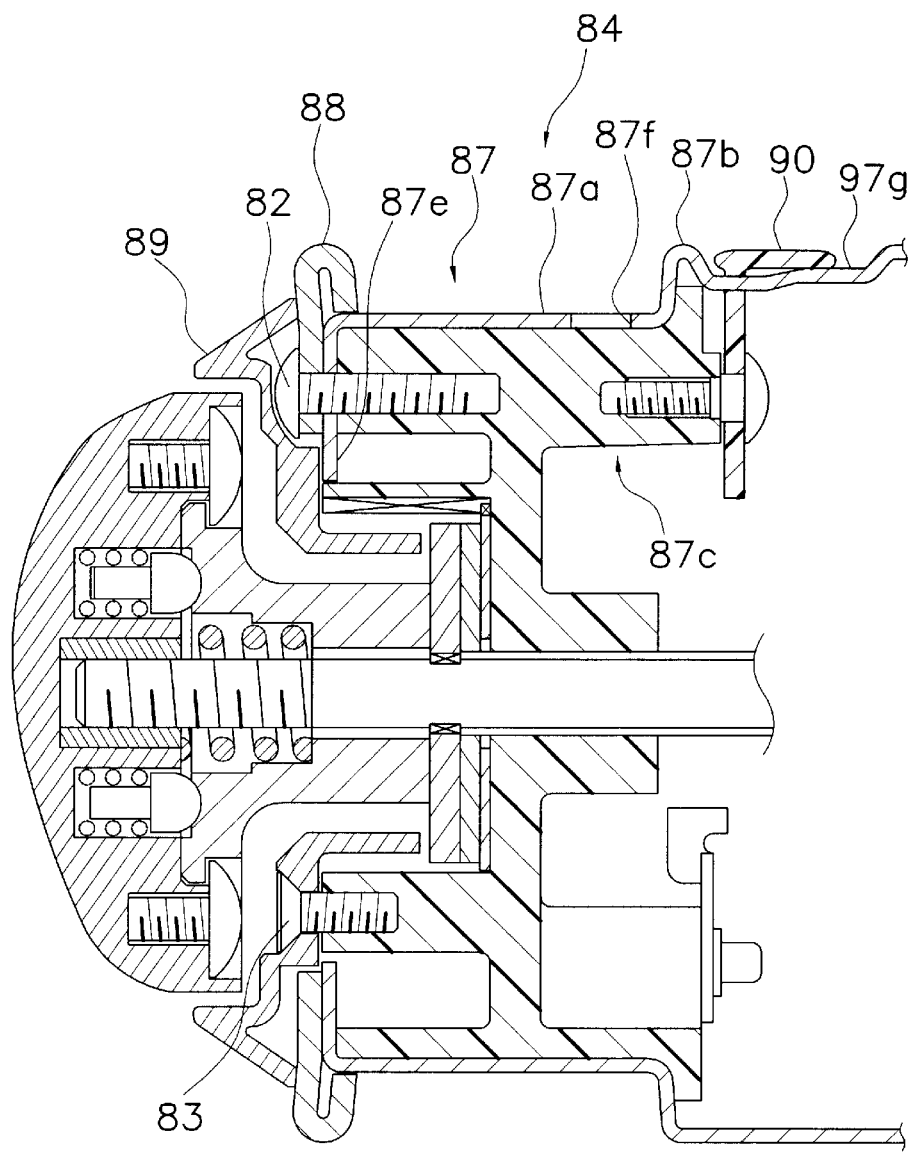
FIG. 12 is a view corresponding to FIG. 3 in a modification of the third embodiment.

Modifications of the Third Embodiment (a) In the third embodiment, the inner barrel member 77c is made of an aluminum alloy, but the embodiment is not thereby limited, and as shown in FIG. 12, the inner barrel member 87c can also be made of a synthetic resin polymer. Furthermore, in the preceding embodiment, the front flange section 78 is made of an aluminum alloy, but the front flange section 88 it can also be made of a stainless alloy or of a ceramic, such as zirconia.

(b) In the third embodiment, the front-flange fixing member 79 was screwed into the inner barrel member 77c, thereby sandwiching the front flange section 78 between the inner barrel member 77c and the front end of the bobbin trunk 77a. Instead of attaching it to the front end of the bobbin trunk 77a however, the front-flange fixing member 89 can also be screwed with bolts 82 and 83 to the rear end of the inner barrel member 87c, as shown in FIG. 12. Incidentally, when the front-flange section 88, the front-flange fixing member 89, and the inner flange portion 87e are fastened together to the inner barrel member 87c, the number of screws can be lower than when they are fastened separately to the inner barrel member 87c.

Figure 13:
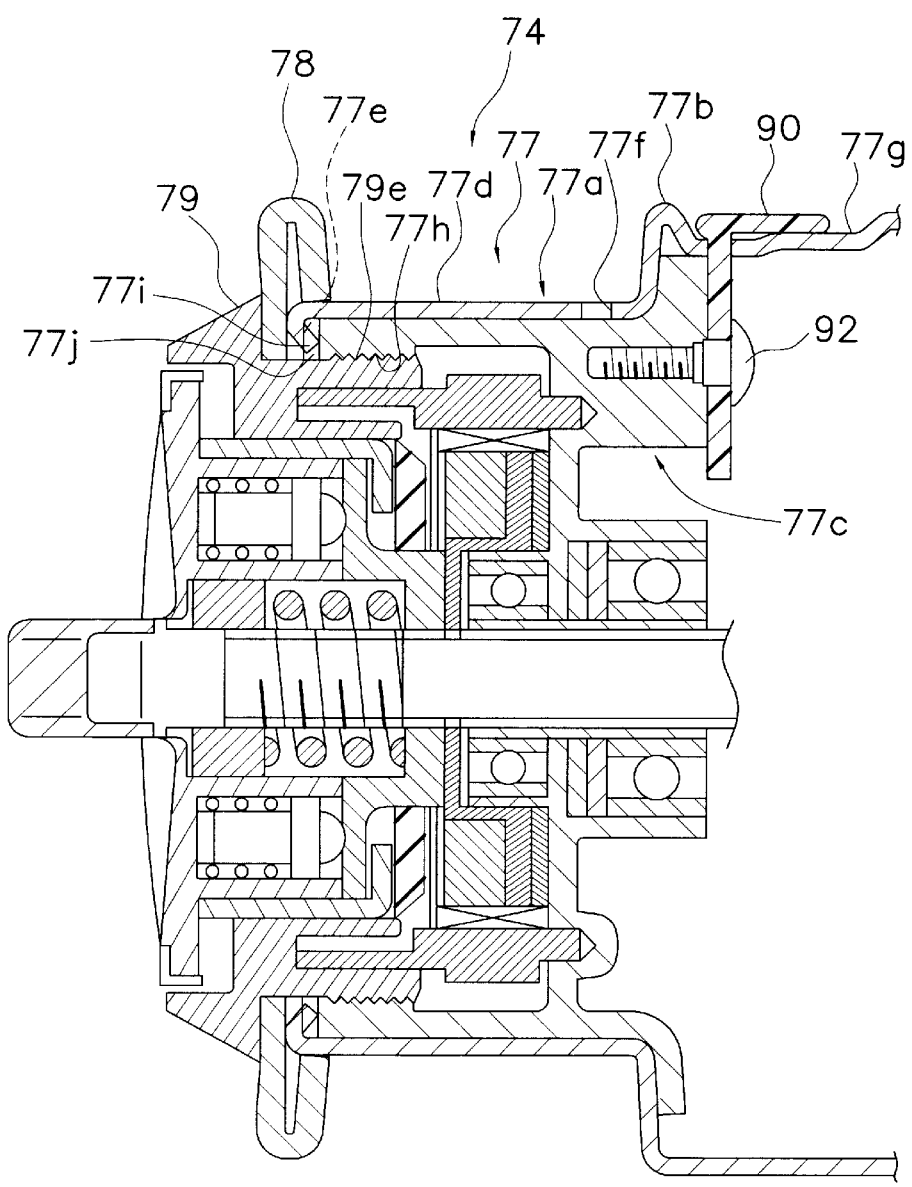
FIG. 13 is a view corresponding to FIG. 3 of yet another modification.

(c) In the third embodiment, the fishing-line catch 90 is fastened with a push nut 91 attached to a protrusion formed at the rear end of the inner barrel member 77c. However, as shown in FIG. 13, it is also possible to fasten the fishing-line catch 90 with a bolt 92, for example.

Fourth Embodiment

Figure 14:
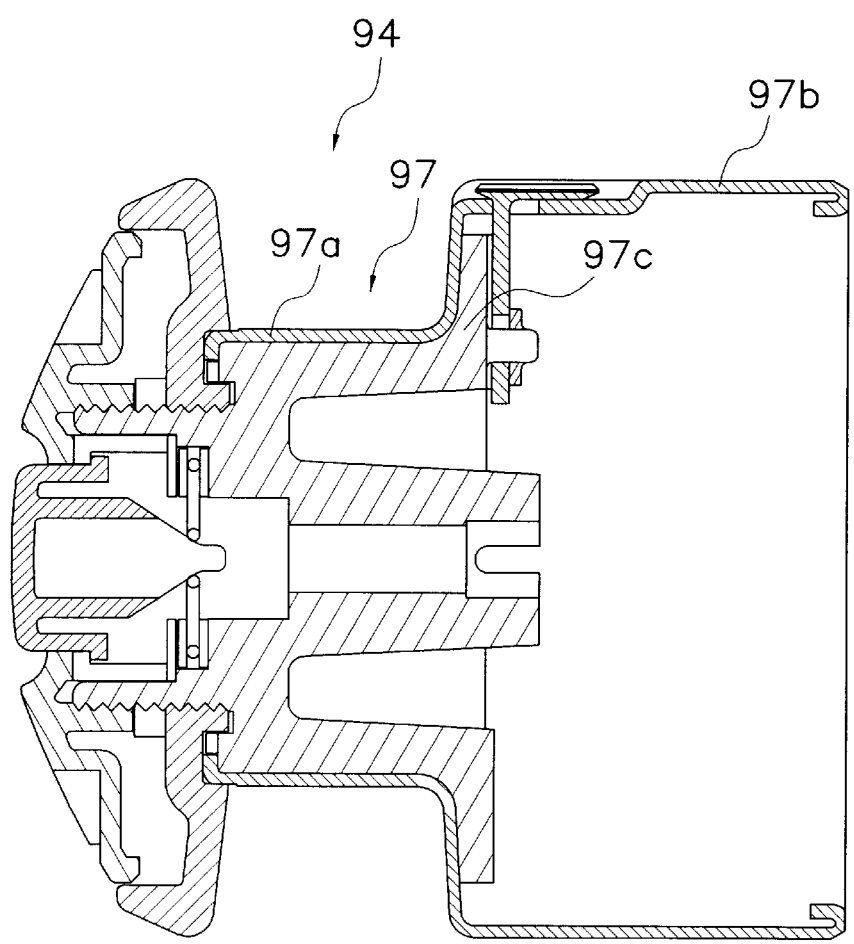
FIG. 14 is an enlarged sectional view of a spool for a reverse-drag type spinning reel in a fourth embodiment of the present invention.

In the spinning reel to which the spools 4, 64 and 74 in the foregoing embodiments is applied, the drag mechanism 60 is disposed to the inner peripheral side of the bobbin trunk 7a, 67a, 77a and the inner barrel member 7c, 67c, 77c. Alternatively, the present invention may be embodied as a spool 94 shown in FIG. 14, adapted to a so-called rear drag type spinning reel. Therein, a rear drag mechanism (not shown) is fitted to the rear end of the spinning reel body, remote from a spool main section 97 that includes bobbin trunk 97a, skirt portion 97b and inner barrel member 97c.

In accordance with the present invention, the bobbin trunk and the skirt portion for spinning reel spools are made from sheet metal, which makes the spool lightweight. Furthermore, an inner barrel member is attached to the bobbin trunk, which enables the bobbin trunk strength to be maintained.

In accordance with another aspect of the present invention, a reinforcement member manufactured of metal is attached to an inner barrel member for spinning reel spools, and therefore by strengthening the inner barrel member, spool deformation is suppressed.

In accordance with still another aspect of the present invention, by strengthening the bobbin trunk for spinning reel spools to a high degree, spool deformation is suppressed while making the spool lightweight.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A spinning reel spool reciprocative with respect to a reel body, the spinning reel spool comprising:
    a tubular bobbin trunk formed from sheet metal and having a substantially equal thickness, said bobbin trunk being for carrying fishing line wound outer circumferentially on said bobbin trunk;
    a skirt portion provided on a rear end of said bobbin trunk, said skirt portion being formed by pressing sheet metal and having a rear flange portion that is formed unitarily on the rear end of said bobbin trunk, and a tubular portion that is formed unitarily on a rear end of said rear flange portion, said rear flange portion having a substantially equal thickness; and
    an inner barrel member attached inner peripherally to said bobbin trunk and extending at least between a front end and said rear end of said bobbin trunk.

2. A spinning reel spool as set forth in claim 1, wherein said skirt portion is formed unitarily rear endwise on said bobbin trunk from said sheet metal, therein being larger-diameter tube-shaped.

3. A spinning reel spool as set forth in claim 2, wherein said inner barrel member extending from its rear end along said skirt portion inner peripherally has an inner flange portion.

4. A spinning reel spool as set forth in claim 1, further comprising a front flange portion provided front endwise on said bobbin trunk and being larger in outside diameter than said bobbin trunk in outside diameter.

5. A spinning reel spool reciprocative with respect to a reel body, the spinning reel spool comprising:
    a tubular bobbin trunk formed from sheet metal and having a substantially equal thickness, said bobbin trunk being for carrying fishing line wound outer circumferentially on said bobbin trunk;
    a skirt portion provided on a rear end of said bobbin trunk;
    an inner barrel member attached inner peripherally to said bobbin trunk and extending at least between a front end and said rear end of said bobbin trunk, said inner barrel member being manufactured of a synthetic resin polymer; and
    a front flange portion provided front endwise on said bobbin trunk and being larger in outside diameter than said bobbin trunk in outside diameter.

6. A spinning reel spool as set forth in of claim 5, further comprising a metal reinforcement member attached to said inner barrel member.

7. A spinning reel spool as set forth in claim 6, wherein said reinforcement member is a washer.

8. A spinning reel spool as set forth in claim 6, wherein said reinforcement member is attached front endwise to said inner barrel member.

9. A spinning reel spool as set forth in claim 8, wherein said reinforcement member is attached between said front flange portion and the front end of said inner barrel member.

10. A spinning reel spool as set forth in claim 6, wherein said reinforcement member is attached rear endwise to said inner barrel member.

11. A spinning reel spool as set forth in claim 6, wherein:
    said inner barrel member has a base portion creating a forward opening space; and
    said reinforcement member is attached to said base portion of said inner barrel member.

12. A spinning reel spool as set forth in claim 11, wherein:
    a drag mechanism for braking said spool is accommodated in said space; and
    said reinforcement member is a washer in said drag mechanism.

13. A spinning reel spool as set forth in claim 6, wherein said reinforcement member is fixed to said inner barrel member by at least one selected from press fitting, gluing, welding, screw fastening and push-nut fastening.

14. A spinning reel spool as set forth in claim 6, wherein an engagement portion into which the front end of said bobbin trunk engages is formed in said front flange portion.

15. A spinning reel spool as set forth in claim 4, wherein said inner barrel member is manufactured of a light metal.

16. A spinning reel spool as set forth in claim 15, wherein the inner barrel member is formed from at least one selected from aluminum alloy, titanium alloy and magnesium alloy.

17. A spinning reel spool as set forth in claim 4, wherein said inner barrel member is fastened to at least one of said bobbin trunk and said skirt portion by at least one selected from press-fitting, gluing, screw fastening and setting in grooves.

18. A spinning reel spool as set forth in claim 4, wherein said front flange portion is attached to said inner barrel member as a separate body.

19. A spinning reel spool as set forth in claim 18, wherein said front flange portion is fixed by being screwed fast to said inner barrel member.

20. A spinning reel spool as set forth in claim 18, further comprising a front-flange fixing member attached to front endwise to said front flange portion.

21. A spinning reel spool as set forth in claim 20, wherein said front-flange fixing member is fixed by being screwed fast to said front flange portion.

22. A spinning reel spool as set forth in claim 20, wherein said front-flange fixing member is fixed by being screwed fast to said inner barrel member.

23. A spinning reel spool as set forth in claim 4, wherein said front flange portion is formed from at least one selected from aluminum alloy, stainless alloy, titanium alloy and magnesium alloy.

24. A spinning reel spool as set forth in claims 4, wherein said front flange portion is curling-worked.

25. A spinning reel spool as set forth in claim 1, wherein said bobbin trunk and said skirt portion are molded unitarily by press-working.

26. A spinning reel spool as set forth in claim 1, wherein said bobbin trunk and said skirt portion are made from at least one selected from aluminum alloy, stainless alloy, titanium alloy and magnesium alloy.

27. A spinning reel spool as set forth in claim 1, wherein a plurality of grooves is formed in the outer peripheral surface of said bobbin trunk along its circumferential direction.

28. A spinning reel spool as set forth in claim 27, wherein the outer peripheral grooves in said bobbin trunk are formed by one selected from cutting, press-working and rolling.

29. A spinning reel spool as set forth in claim 1, wherein said skirt portion has through-holes formed by press-working through its outer circumferential surface.

30. A spinning reel spool as set forth in of claim 1, wherein said sheet metal is 1.5 mm or less in thickness.

31. A spinning reel spool reciprocative with respect to a reel body, the spinning reel spool comprising:
   a tubular bobbin trunk formed from sheet metal, for carrying fishing line wound outer circumferentially thereon;
   a skirt portion provided rear endwise on said bobbin trunk; and
   an inner barrel member attached inner peripherally to said bobbin trunk, wherein:
      a plurality of grooves is formed in the outer peripheral surface of said bobbin trunk along its circumferential direction;
      said inner barrel member has on its outer peripheral surface a plurality of recesses along its circumferential direction; and
      the outer peripheral grooves in said bobbin trunk are formed to parallel said recesses.

32. A spinning reel spool reciprocative with respect to a reel body, the spinning reel spool comprising:
   a tubular bobbin trunk formed from sheet metal, for carrying fishing line wound outer circumferentially thereon;
   a skirt portion provided rear endwise on said bobbin trunk;
   an inner barrel member attached inner peripherally to said bobbin trunk; and
   a front flange portion provided front endwise on said bobbin trunk and being larger in outside diameter than said bobbin trunk in outside diameter,
   wherein
      said front flange portion is formed unitarily with said inner barrel member.

33. A spinning reel spool reciprocative with respect to the reel body, the spinning reel spool comprising:
   a tubular bobbin trunk formed from sheet metal, for carrying fishing line wound outer circumferentially thereon;
   a skirt portion provided rear endwise on said bobbin trunk;
   an inner barrel member attached inner peripherally to said bobbin trunk; and
   a beaded portion, wherein said skirt portion at its rear end is folded toward its inner periphery.

34. A spinning reel spool as set forth in claim 33, wherein said beaded portion is formed by a curling process.

35. A spinning reel spool reciprocative with respect to the reel body, the spinning reel spool comprising:
   a tubular bobbin trunk formed from sheet metal, for carrying fishing line wound outer circumferentially thereon;
   a skirt portion provided rear endwise on said bobbin trunk; and
   an inner barrel member attached inner peripherally to said bobbin trunk; and
   a front flange portion provided front endwise on said bobbin trunk and being larger in outside diameter than said bobbin trunk in outside diameter,
   wherein
      said bobbin trunk includes:
         a tubular portion outer circumferentially onto which fishing line is wound, formed from sheet metal; and
         an inner flange portion formed unitarily with said tubular portion and whose front end extends circumferentially inward.

36. A spinning reel spool as set forth in claim 35, wherein said inner flange portion has at least one engager portion, and said inner barrel member has at least one counter-engager portion for engaging with said engager and stopping-said inner flange portion from turning.

37. A spinning reel spool as set forth in claim 35, wherein said front flange portion is fixed by co-fastening to said inner flange portion and said inner barrel member.

* * * * *